United States Patent
Kang et al.

(10) Patent No.: US 8,773,527 B2
(45) Date of Patent: Jul. 8, 2014

(54) SYSTEM AND METHOD FOR CAPTURING DEBUG INFORMATION USING A PERIPHERAL DEVICE

(75) Inventors: Byung Kang, Downey, CA (US); Paul Suntae Kim, Mahwah, NJ (US); Tae Hee Kim, Wayne, NJ (US); Jason Rowe, Aliso Viejo, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1407 days.

(21) Appl. No.: 11/845,587

(22) Filed: Aug. 27, 2007

(65) Prior Publication Data

US 2009/0059000 A1 Mar. 5, 2009

(51) Int. Cl.
*H04N 7/18* (2006.01)

(52) U.S. Cl.
USPC ............... 348/125; 709/224; 725/13; 725/14

(58) Field of Classification Search
USPC .................... 348/125; 709/224; 725/13–14
See application file for complete search history.

(56) References Cited

U.S. PATENT DOCUMENTS

| | | | |
|---|---|---|---|
| 7,124,326 B1 * | 10/2006 | Niikawa | 714/37 |
| 7,889,233 B2 * | 2/2011 | Mead et al. | 348/180 |
| 2003/0004680 A1 * | 1/2003 | Dara-Abrams et al. | 702/183 |
| 2004/0054771 A1 * | 3/2004 | Roe et al. | 709/224 |
| 2005/0097405 A1 * | 5/2005 | Sesek et al. | 714/48 |
| 2006/0090093 A1 * | 4/2006 | Goedde et al. | 714/4 |
| 2007/0050844 A1 * | 3/2007 | Lebel | 726/13 |
| 2007/0056011 A1 * | 3/2007 | Kwon et al. | 725/133 |
| 2007/0061623 A1 * | 3/2007 | Yuan et al. | 714/26 |
| 2007/0067809 A1 * | 3/2007 | Kwon et al. | 725/80 |
| 2007/0115860 A1 * | 5/2007 | Samele et al. | 370/259 |
| 2007/0271273 A1 * | 11/2007 | Cradick et al. | 707/10 |
| 2007/0274223 A1 * | 11/2007 | Cha et al. | 370/241 |
| 2007/0277061 A1 * | 11/2007 | Ashe | 714/57 |
| 2008/0313603 A1 * | 12/2008 | Denkel | 717/106 |

* cited by examiner

*Primary Examiner* — Duyen Doan
(74) *Attorney, Agent, or Firm* — Kenneth L. Sherman, Esq.; Michael Zarrabian, Esq.; Sherman & Zarrabian LLP

(57) ABSTRACT

A system and method for capturing debug information are disclosed. In one aspect, a method comprises connecting a portable test device having a memory and no processor to a television, the test device having stored therein a debug program configured to be executed by a control unit of the television to capture debug information from the television and store the captured debug information on the test device.

34 Claims, 3 Drawing Sheets

SYSTEM AND METHOD FOR CAPTURING DEBUG INFORMATION USING A PERIPHERAL DEVICE

BACKGROUND OF THE INVENTION

1. Field of the Invention

The invention relates to a system and method for debugging an electronic product such as a television. More particularly, the invention relates to a system and method for capturing debug information.

2. Description of the Related Technology

After a product is released in the market, it may have many technical issues that were not found in the development stage. It is necessary to debug the product in order to determine the cause of the problem and to find a resolution. Debug logs provide the information that a manufacturer or developer needs to complete these tasks.

Currently, the debug process is solely done by engineers and technicians. As a result, they must reacquire the product from a customer (e.g. an end user) or go directly to the customer in order to capture debug information (such as debug logs). It may result in high costs to receive the product through mail or to send an engineer out to the customer's location. Furthermore, this may increase the time it takes to resolve the technical problems. If the manufacturer fixes the problem after reacquiring the product, it would have to ship the product back to the customer, thus forcing the customer to wait longer. If the manufacturer wants to send out an engineer, it might have to work around the engineer's schedule, thus creating possible delays for the customer until the engineer is available.

Therefore, it is desirable to have a debug process which may avoid the disadvantages of the existing debug process.

SUMMARY OF CERTAIN INVENTIVE ASPECTS

The system, method, and devices of the invention each have several aspects, no single one of which is solely responsible for its desirable attributes. Without limiting the scope of this invention, its more prominent features will now be briefly discussed.

In one aspect, a method of capturing debug information from a television is disclosed. The method comprises connecting a portable test device having a memory and no processor to a television, the test device having stored therein a debug program configured to be executed by a control unit of the television to capture debug information from the television and store the captured debug information on the test device.

In another aspect, a device for capturing debug information from a television is disclosed. The device comprises a debug program configured to be executed by a control unit of a television to capture debug information from the television and store the captured debug information on the device. The device further comprises a memory unit configured to store the debug program and the captured debug information.

In another aspect, a method of debugging a television at a remote location is disclosed. The method comprises delivering a test device to a remote location having a television, the test device having stored therein a debug program configured to be executed by a control unit of the television to capture debug information from the television and store the captured debug information on the test device. The method further comprises, at the remote location, connecting the test device to the television such that the debug program is executed by the television to capture debug information and store the captured debug information on the test device. The method further comprises receiving the test device having stored therein the captured debug information. The method further comprises analyzing the captured debug information.

In another aspect, a method of capturing debug information from a television is disclosed. The method comprises coupling a portable test device having a memory to a television, the test device having stored therein a debug program configured to be executed by a control unit of the television to capture debug information from the television and store the captured debug information on the test device.

In another aspect, a device for capturing debug information from a television is disclosed. The device comprises means for capturing debug information from the television and store the captured debug information on the device. The device further comprises means for storing the capturing means and the captured debug information.

DETAILED DESCRIPTION OF CERTAIN INVENTIVE EMBODIMENTS

Figure 1:
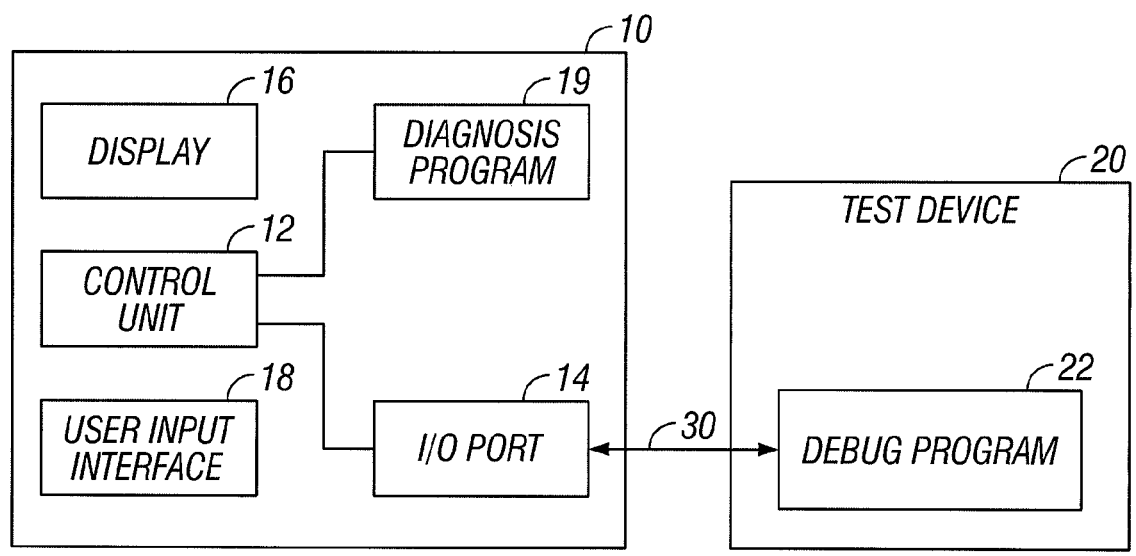
FIG. 1 is a diagram illustrating a test device connected to a television.

Various aspects and features of the invention will become more fully apparent from the following description and appended claims taken in conjunction with the foregoing drawings. In the drawings, like reference numerals indicate identical or functionally similar elements. In the following description, specific details are given to provide a thorough understanding of the disclosed methods and apparatus. However, it will be understood by one of ordinary skill in the technology that the disclosed systems and methods may be practiced without these specific details. For example, electrical components may be shown in block diagrams in order not to obscure certain aspects in unnecessary detail. In other instances, such components, other structures and techniques may be shown in detail to further explain certain aspects.

It is also noted that certain aspects may be described as a process, which is depicted as a flowchart, a flow diagram, a structure diagram, or a block diagram. Although a flowchart may describe the operations as a sequential process, many of the operations may be performed in parallel or concurrently and the process may be repeated. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Certain embodiments as will be described below relate to a method of capturing debug information from a television using a test device. In one embodiment, a peripheral test device (e.g., a flash medium) having a debug program stored thereon is inserted into a television undergoing debugging test. The debug program is configured to be executed by a control unit of the television to capture debug information from the television and store the captured debug information on the test device. The debug program may be automatically executed by the television when being connected to the television. The debug program runs automatically without any user input, or it has a menu-based interface to interact with a user and capture debug information based on input from the user. This method therefore gives a customer the ability to obtain debug information, and provides a more efficient process of resolving technical problems associated with an electronic product, and avoids the disadvantages found in prior art debugging method. Though a television is used for the illustration purpose, this method and system may be applied to any electronic product which includes a control unit. The electronic product may include, for example, personal computer, printer, and personal data assistant.

FIG. 1 is a diagram illustrating a test device being connected to a television. The television 10 includes a control unit 12 which controls the operation of the device. In one embodiment, the control unit 12 is a processor which may be any suitable general purpose single- or multi-chip microprocessor, or any suitable special purpose microprocessor such as a digital signal processor, microcontroller, or a programmable gate array. As is conventional, the processor may be configured to execute one or more software applications.

The television 10 further includes an input/output (I/O) port 14 to which an external device test device 20 may be connected. In one embodiment, the I/O port 14 may be any suitable input slot or interface, for example, a universal serial bus (USB) port or an input port for receiving a flash media device.

The television 10 further includes a display 16 and a user input interface 18 that enable user interaction. The display 16 is used to communicate information, instructions, or data to a user. The user input interface 18 is configured to receive input data or instruction from a user. Both the display and the user input interface may be implemented in many forms and may contain multiple components. In a television, the display 16 is usually a screen. The user input interface 18 may be, for example, a remote control.

The television 10 may further include a diagnosis program embedded in the television. The diagnosis program may be, for example, executed by the control unit 12 to monitor, test, or debug the television. The diagnosis program is typically designed specifically for the television 10 in which the program is embedded. In one embodiment, the diagnosis program may, for example, gather information related to debug logs as requested by another debug program.

The test device 20 may be any device that has a storage unit having stored therein a debug program 22. The storage unit may be any suitable storage device, either volatile or nonvolatile. The storage device may include, but not limited to, a hard disk, and a flash media card (e.g., a secure digital (SD) card and a universal serial bus (USB) drive). In one embodiment, the test device 20 is a passive storage device such as an external hard disk or a flash storage media. In another embodiment, the test device 20 includes components other than the storage unit such as a control unit. The test device 20 may be, for example, a personal digital assistant.

In one embodiment, the test device 20 is a portable device. The test device 20 has substantially smaller sizes and/or less weight than the television 10 under debugging. In one embodiment, the test device 20 has a size no larger than a flash storage media.

The test device 20 is connected to the television 10 via a link 30, in order to capture debug information from the television 10. The test device 20 has a compatible interface to connect to the television 10. In one embodiment, the test device 20 is a flash media card and the I/O port 14 on the television 10 is a compatible interface configured to read the flash media card. The link 30 is established between the television 10 and the test device 20 when the flash media card is inserted into the I/O port 14. In another embodiment, the test device 20 is a USB external hard drive and the I/O port 14 is a USB interface. The link 30 established between the television 10 and the test device 10 thus is a USB link.

In one embodiment, the debug program 22 is an executable program stored on the storage unit of the test device 20. When being connected to the television 10, the debug program 22 is read by the television 10 via the I/O port 14 and then executed by the control unit 12 of the television 10. The debug program is configured to capture debug information (such as debug logs) from the television 10 and then save the captured debug information on the test device 20.

In one embodiment, the debug program 22 is configured to be automatically executed by the television 20, i.e., with no user input required, when the test device is connected to the television. This may be implemented in various ways. For example, the debug program 20 may be of a pre-determined file type or a file name which the control unit 12 of the television 10 is configured to execute automatically with no user input required.

In one embodiment, the debug program 22 captures debug information by calling the diagnosis program 19 embedded in the television 10.

The debug program 22 may be designed to capture debug information automatically without any interaction with a user. Alternatively, the debug program may need to interact with a user of the television 10 in order to capture debug information and store the same on the test device 20. In one embodiment, the debug program is designed such that any person, including an ordinary user of the television 10, is able to capture debug information using the debug program. An ordinary user of the television 10 as used herein refers to an end user or a customer of the television 10, who typically lacks advanced knowledge about the television 10. In an exemplary embodiment, when the test device 20 is inserted into the television 10, the control unit 12 of the television 10 reads the debug program 22 from the test device 20 and executes the same. The debug program then interacts with the user using the display 16 and the user input interface 18 of the television 10 in capturing debug information. The user may interact with the debug program by, for example, a menu-based interface or a graphical user interface (GUI) on the display 16 of the television. The user may use, for example, a remote control to enter instructions or information requested by the debug program.

FIGS. 2A-2D are a series of screenshots of the display of a television when executing one embodiment of the debug program. As illustrated, the debug program displays a GUI on the display of the television 10 and guides the user through step-by-step questions to determine what problems are occurring on the television 10. Based on pre-determined setting for the answers received from the user, the debug program then captures necessary debug information and stores on the test device 20. The captured debug information may be stored as at least one computer-readable file (e.g., a text file).

Figure 2A:
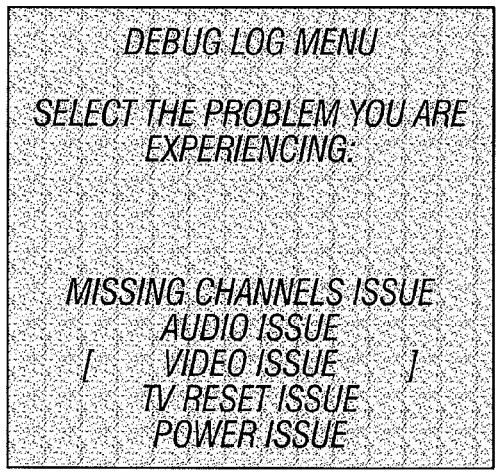
FIGS. 2A-2D are a series of screenshots of the display of a television when executing one embodiment of the debug program.
Figure 2B:
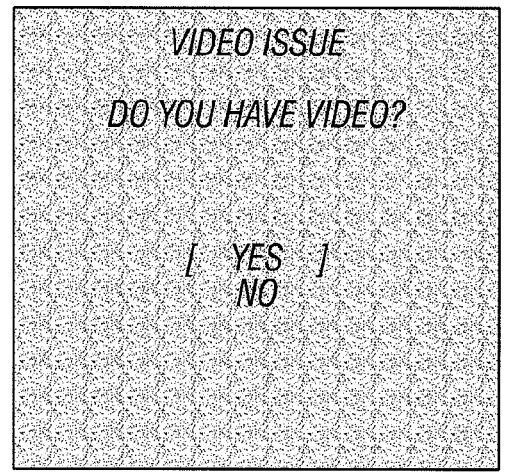
Figure 2C:
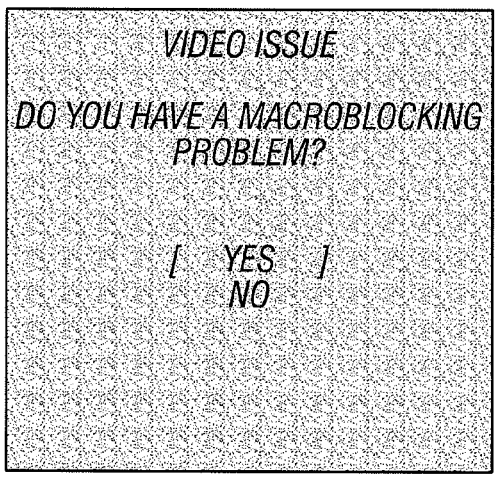
Figure 2D:
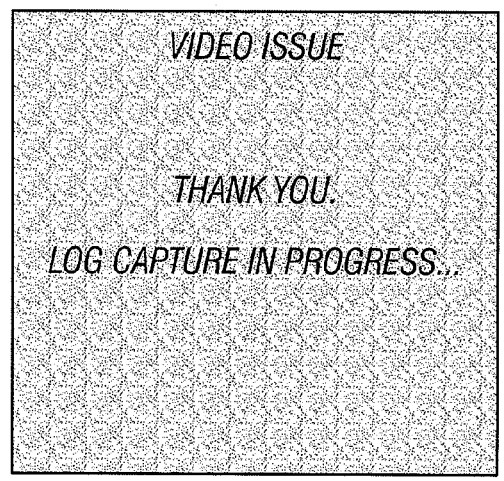

In FIG. 2A, the debug program presents the user with a menu including a list of items to identify the technical issue of the television 10. The user may use a remote control of the television to move the cursor up and down and then select the appropriate item. Once a user makes a choice, e.g., selecting the menu item "video issue", the debug program shows the next menu which is generated based on the user's previous input. As shown in FIG. 2B, the user is asked to further identify the technical issue of the television, e.g. whether the user currently has video. In the example, the user selects "yes", which brings the user to the next menu as shown in FIG. 2C. Again, the user is asked to make a selection from the menu to help the debug program to narrow the technical issue. In FIG. 2D, the debug program displays a message to the user confirming that the debug program has the required information and is in the process of capturing debug information. The debug program then captures debug information based on previous input from the user.

In one embodiment, the debug program may use, for example, dialog boxes to ask for a user's help in troubleshooting, especially when a particular change in the physical environment of the television is needed for the debug program to capture the debug logs. The user may be asked to, for example, insert a peripheral device or memory card into the television, or connect a high definition multimedia interface (HDMI) device to the television.

In one embodiment, the debug program is configured to execute a series of user commands on the television in order to capture appropriate debug logs. Typically, a television has a user menu operable by a remote control for a user to set certain configurations or change channels. A customer may report that a video problem occurs when he goes into the user menu and select a specific feature. The debug program may be configured to execute the same series of user commands, i.e., going into the user menu and selecting the specific feature, in order to capture debug logs under the condition which triggers the video problem.

Figure 3:
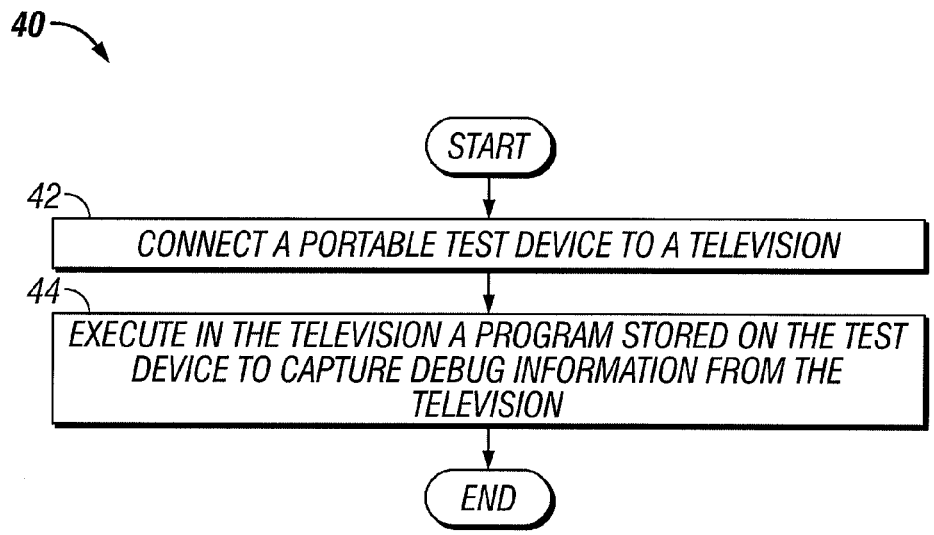
FIG. 3 is a flowchart of one embodiment of a method of capturing debug information from a television.

FIG. 3 is a flowchart of one embodiment of a method of capturing debug information from a television using a test device. Depending on the embodiment, certain steps of the method may be removed, merged together, or rearranged in order.

The method 40 begins at a block 42, wherein a portable test device 20 is connected to a television 10 undergoing debugging test. The test device may be connected to the television via local link such as a USB link. The test device 20 contains a debug program designed to capture debug information and store the captured debug information on the test device.

Next at a block 44, the debug program stored on the test device 20 is executed in the television to capture debug information from the television 10 and store the captured debug information on the test device 20. In one embodiment, the debug program is read and executed by the control unit of the television 10. The debug program may capture debug information from the television 10 automatically with no user input required. The debug program may interact with a user of the television and capture debug information from the television based on the input from the user. In one embodiment, the debug program displays a GUI on the display of the television and guides the user, for example, through step-by-step questions to determine what problems are occurring on the television 10. Based on pre-determined setting for the answers received from the user, the debug program then captures necessary debug information and stores on the test device 20. The captured debug information may be stored as at least one computer-readable file (e.g., a text file).

In one embodiment, the debug program 22 captures debug information by calling the diagnosis program 19 embedded in the television 10.

In one embodiment, the debug program 22 is configured to be automatically executed by the television 20, i.e., with no user input required, when the test device is connected to the television. Thus, the process of Block 42 automatically triggers the process of Block 44.

This embodiment discloses a method of capturing debug information using a test device. It greatly simplifies the process to capture debug information for engineers, technicians, and even customers. This method may be used in many applications to improve the process of debugging a television. For example, it may be used in a quality assurance department for a television manufacturer. When product testers find problems in the development stage, they may use the test device connecting to the television to capture debug information. The test device containing the captured debug information is then forwarded to product developers for analysis. The following embodiment is another example of using the method of capturing debug information with a test device to improve the process of debugging a television.

Figure 4:
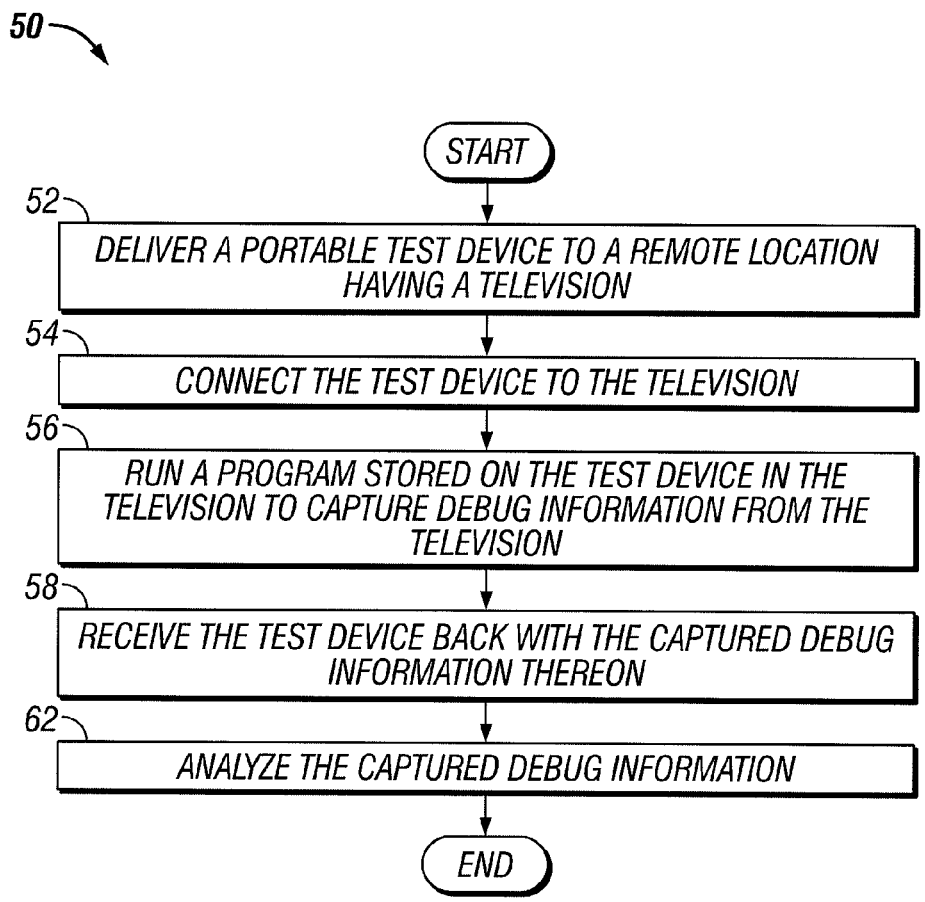
FIG. 4 is a flowchart of one embodiment of a method of debugging a television.

FIG. 4 is a flowchart of one embodiment of a method of debugging a television at a remote location. Depending on the embodiment, certain steps of the method may be removed, merged together, or rearranged in order.

The method 50 begins at a block 52, wherein a portable test device 20 is delivered to a remote location having the television that needs debugging. The test device 20 may be delivered, for example, in mail from an engineer working for the manufacturer of the television to a user of the television. The test device 20 contains a debug program designed to capture debug information and store the captured debug information on the test device. In one embodiment, the test device has substantially smaller sizes and/or less weight than the product under debugging.

Next at a block 54, the test device 20 is locally connected to the television 10 by the user. For example, the test device 20 may be inserted into a local port (e.g., a USB bus) of the television.

Moving to a block 56, the debug program stored on the test device is executed in the television, e.g. by a control unit of the television to capture debug information from the television and to store the captured debug information on the test drive. In one embodiment, the debug program is read and executed by the television 10 automatically once the test device is connected. The debug program may capture debug information from the television automatically. The debug program may interact with a customer of the television in order to capture debug information from the television. The debug information captured from the television is stored on the debug device. When the debug program is complete, the customer may eject the test device and deliver it back to the engineer working for the manufacturer. The captured debug information may be stored as at least one computer-readable file (e.g., a text file).

Next at a block 58, the test device is received with the captured debug information storing thereon by, for example, the engineer working for the manufacturer of the television from the user of the television. Moving to block 62, the captured debug information is then analyzed to diagnose the problems occurring on the television by, for example, the engineer working for the manufacturer of the television. The engineer may, for example, read through a text file storing the captured debug information and determine what problems are occurring on the television. The engineer may also create a solution to the problem as identified.

The above method may start, for example, when a customer reports a technical issue on its television to an engineer who then prepares a portable test device having stored therein a debug program. The debug program may be customized by the engineer to capture the debug logs needed for the reported technical issue. The engineer may, for example, manually select the logs needed for capture and save the preference into the debug program.

In the exemplary embodiment, a manufacturer of the television sends a peripheral test device directly to the customer, and then the customer inserts it into the television to capture debug information. The debug information is stored on the peripheral device. The customer then mails back the test device to the manufacturer so that the developer or engineer working for the manufacturer may look at the debug data and determine the cause of the technical problems.

By giving the customer (or an ordinary user) the ability to obtain debug information, this embodiment provides a more efficient process of resolving technical problems associated with an television, and avoids the disadvantages found in prior art debugging method. First, it lowers the expenses to the manufacturer since it is cheaper to ship the test device than the television. Second, the embodiment eliminates the need for an engineer working for the manufacturer to travel to the remote location at which the television is. Third, it shortens the delay in serving the customer. In case an engineer has to schedule a later time to go to the customer's location, the technical problem may be solved more quickly by using this embodiment instead.

In the foregoing embodiments, the debug program is automatically executed by the television once the testing device is connected. Alternatively, the debug program may be selected and executed by a user through the user input interface and display of the television. Also, the debug program may be executed by the test device if the test device further comprises a control unit.

In certain embodiments as described above, the test device is locally connected to the television. It should be noted that, in some applications, the test device may be remotely connected to the television. This also removes the need to deliver the test device to where the television is located.

In the foregoing embodiments, a television is used for the illustration purpose. It should be noted that these embodiments may be applied to any suitable electronic product, and should not be limited to a television.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of capturing debug information from a television, the method comprising:
    customizing a debug program to execute one or more user commands, wherein the user commands execute same or similar commands previously entered on the television by an end-user of the television, wherein the executed user commands are used for generating debug information, capturing relevant debug logs and storing the relevant debug logs, such that said debug logs are captured under conditions that closely re-create a scenario that triggered a specific problem and contain only debugging data resulting from the debug program; and
    connecting a portable test device having a memory and no processor to a television, the test device having stored therein the debug program that is executed by a control unit of the television for capturing the relevant debug logs from the television and for storing the captured relevant debug logs on the test device.

2. The method of claim 1, wherein the test device is connected to a local port of the television.

3. The method of claim 1, wherein the test device is connected to a USB port of the television.

4. The method of claim 1, wherein the debug program is customized to be automatically executed by the television when the test device is connected to the television.

5. The method of claim 1, wherein the debug program is designed to capture relevant debug logs from the television with no user input.

6. The method of claim 1, wherein the debug program is designed to interact with and guide a user for narrowing a technical issue, via a user interface of the television, and to capture relevant debug logs from the television based on input from the user.

7. The method of claim 1, wherein the debug program is an executable program.

8. The method of claim 1, wherein the debug program has a menu-based interface.

9. The method of claim 1, wherein the debug program captures relevant debug logs from the television by calling a diagnosis program embedded in the television.

10. The method of claim 1, wherein the test device is a passive storage device.

11. The method of claim 1, wherein the test device is a non-volatile storage device.

12. The method of claim 1, wherein the test device is a flash media card.

13. A device for capturing relevant debug logs from a television, the device comprising:
    a debug program that is executed by a control unit of the television for capturing the relevant debug logs from the television and for storing the captured relevant debug logs on the device, wherein the debug program is customized for executing one or more user commands, wherein the user commands execute same or similar commands previously entered on the television by an end-user of the television, wherein the debug program executes for generating debug information and capturing relevant debug logs based on the one or more user commands executed by the debug program, such that said relevant debug logs are captured under conditions that closely re-create a scenario that triggered a specific problem and contain only debugging data resulting from the debug program; and
    a memory unit that stores the debug program and the captured relevant debug logs.

14. The device of claim 13, further comprising an interface configured to connect to the television.

15. The device of claim 14, wherein the interface is a USB interface.

16. The device of claim 13, wherein the debug program is configured to be automatically executed by the television when the test device is connected to the television.

17. The device of claim 13, wherein the debug program is designed to capture relevant debug logs from the television with no user input.

18. The device of claim 13, wherein the debug program is designed to interact with and guide a user for narrowing a technical issue, via the user interface of the television, and to capture relevant debug logs from the television based input from the user.

19. The device of claim 13, wherein the debug program has a menu-based interface.

20. The device of claim 13, wherein the debug program capture relevant debug logs from the television by calling a diagnosis program embedded in the television.

21. The device of claim 13, wherein the device is a passive storage device.

22. The device of claim 13, wherein the device is a portable device.

23. The device of claim 13, wherein the test device is a non-volatile storage device.

24. The device of claim 13, wherein the test device is a flash media card.

25. A method of debugging a television at a remote location, the method comprising:

delivering a test device to a remote location having a television, the test device having stored therein a debug program that is executed by a control unit of the television and executes a series of user commands for generating debug information, capturing relevant debug logs from the television and for storing the captured relevant debug logs on the test device, wherein the debug program is customized for executing one or more user commands, wherein the user commands execute same or similar commands previously entered on the television by an end-user of the television, and wherein said relevant debug logs are captured under conditions that closely re-create a scenario that triggered a specific problem and contain only debugging data resulting from the debug program;

at the remote location, connecting the test device to the television such that the debug program is executed by the television for capturing relevant debug logs for storing the captured relevant debug logs on the test device;

receiving the test device having stored therein the captured relevant debug logs; and analyzing the captured relevant debug logs.

26. The method of claim 25, wherein the debug program is designed to capture the relevant debug logs from the television without user input.

27. The method of claim 25, wherein the debug program is designed to interact with and guide a user of the television for narrowing a technical issue, via the user interface of the television, and to capture the relevant debug logs from the television based on input from the user.

28. The method of claim 25, wherein the debug program is configured to be automatically executed by the television when the test device is connected to the television.

29. The method of claim 25, wherein the debug program captures relevant debug logs from the television by calling a diagnosis program embedded in the television.

30. The method of claim 25, wherein the debug program has a menu-based interface.

31. The method of claim 1, wherein the debug program is customized for only capturing and saving selected debug logs.

32. The method of claim 1, wherein the debug program provides guided step-by-step user questions for determining technical problems with the television.

33. The method of claim 1, wherein the debug program is customized for capturing and saving particular debug logs for a particular reported technical issue.

34. The method of claim 33, wherein the portable test device is used by a manufacturer for determining a cause for the particular reported technical issue.

* * * * *